US012306076B2

(12) United States Patent
Markins et al.

(10) Patent No.: US 12,306,076 B2
(45) Date of Patent: May 20, 2025

(54) SYSTEMS, APPARATUSES, AND METHODS FOR SAMPLE CYLINDER INSPECTION, PRESSURIZATION, AND SAMPLE DISPOSAL

(71) Applicant: MARATHON PETROLEUM COMPANY LP, Findlay, OH (US)

(72) Inventors: Alex M. Markins, Findlay, OH (US); Heath B. Jones, Findlay, OH (US); Nicci R. Triche, Findlay, OH (US); John J. Langenfeld, Findlay, OH (US); Masaru F. Williams, Findlay, OH (US); David S. Spence, Findlay, OH (US); Jason M. Chauvin, Findlay, OH (US); Gregory D. Bender, IV, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 18/660,290

(22) Filed: May 10, 2024

(65) Prior Publication Data
US 2024/0377287 A1 Nov. 14, 2024

Related U.S. Application Data

(60) Provisional application No. 63/466,043, filed on May 12, 2023.

(51) Int. Cl.
*G05D 11/00* (2006.01)
*F16K 13/00* (2006.01)
(Continued)

(52) U.S. Cl.
CPC ......... *G01N 1/2035* (2013.01); *G01N 1/2226* (2013.01); *G01N 2001/205* (2013.01);
(Continued)

(58) Field of Classification Search
CPC . G01N 30/24; B67D 1/00; B67D 3/00; B67D 7/00; G01F 1/00; G01F 3/00
(Continued)

(56) References Cited

U.S. PATENT DOCUMENTS

| 981,434 A | 1/1911 | Lander |
| 1,526,301 A | 2/1925 | Stevens |

(Continued)

FOREIGN PATENT DOCUMENTS

| AT | 11772 U1 | 4/2011 |
| BR | PI0701518 | 11/2008 |

(Continued)

OTHER PUBLICATIONS

Bollas et al., "Modeling Small-Diameter FCC Riser Reactors. A Hydrodynamic and Kinetic Approach", Industrial and Engineering Chemistry Research, 41(22), 5410-5419, 2002.
(Continued)

*Primary Examiner* — Monzer R Chorbaji
(74) *Attorney, Agent, or Firm* — RAY QUINNEY & NEBEKER P.C.; Paul N. Taylor

(57) ABSTRACT

Systems, apparatuses, and methods for enhancing handling of a sample cylinder may include first, second, and third stations, each configured to receive a sample cylinder containing a material sample. The first station may include a first mounting fixture configured to be attached to the sample cylinder, a viewing glass to facilitate inspection of a portion of the material sample, and a first valve configured to remove a portion of the material sample from the sample cylinder. The second station may include a second mounting fixture and a second valve to provide fluid flow between a source of pressurized gas and the sample cylinder, thereby to pressurize the sample cylinder. The third station may include a third mounting fixture configured to be attached to the
(Continued)

sample cylinder and a third valve to provide fluid flow between the sample cylinder and ventilation ductwork or a receptable.

30 Claims, 9 Drawing Sheets

(51) Int. Cl.
 *G01N 1/20* (2006.01)
 *G01N 1/22* (2006.01)
(52) U.S. Cl.
 CPC ............... *G01N 2001/2085* (2013.01); *G01N 2001/2238* (2013.01)
(58) Field of Classification Search
 USPC .................. 422/62, 79; 137/88, 154, 247
 See application file for complete search history.

(56) References Cited

U.S. PATENT DOCUMENTS

| | | |
|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,312,645 A | 1/1982 | Mavros |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,583,859 A | 4/1986 | Hall, II |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,798,463 A | 11/1989 | Koshi |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |

(56) References Cited

U.S. PATENT DOCUMENTS

| | | |
|---|---|---|
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,120,517 A | 6/1992 | Elshout |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,302,294 A | 4/1994 | Schubert |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,415,025 A | 5/1995 | Bartman et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,516,969 A | 5/1996 | Krasznai et al. |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,681,749 A | 10/1997 | Ramamoorthy |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,751,415 A | 5/1998 | Smith et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |
| 6,040,186 A * | 3/2000 | Lewis .................... G01N 30/24 422/89 |
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |

(56) References Cited

U.S. PATENT DOCUMENTS

| | | |
|---|---|---|
| 6,063,265 A | 5/2000 | Chiyoda et al. |
| 6,070,128 A | 5/2000 | Descales et al. |
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,100,975 A | 8/2000 | Smith et al. |
| 6,102,655 A | 8/2000 | Kreitmeier |
| 6,105,441 A | 8/2000 | Conner et al. |
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |
| 6,190,535 B1 | 2/2001 | Kalnes et al. |
| 6,203,585 B1 | 3/2001 | Majerczak |
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,592,448 B1 | 7/2003 | Williams |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B1 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | van Schie |

(56) References Cited

U.S. PATENT DOCUMENTS

| | | |
|---|---|---|
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,784,645 B2 | 7/2014 | Iguchi et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |
| 9,273,867 B2 | 3/2016 | Buzinski et al. |
| 9,279,748 B1 | 3/2016 | Hughes et al. |
| 9,289,715 B2 | 3/2016 | Høy-Petersen et al. |
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,453,169 B2 | 9/2016 | Stippich, Jr. et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,662,597 B1 | 5/2017 | Formoso |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 9,988,585 B2 | 6/2018 | Hayasaka et al. |
| 10,047,299 B2 | 8/2018 | Rubin-Pitel et al. |
| 10,048,100 B1 | 8/2018 | Workman, Jr. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,578,638 B2 | 2/2023 | Thobe |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr. et al. |
| 11,920,096 B2 | 3/2024 | Woodchick et al. |
| 11,921,035 B2 | 3/2024 | Bledsoe, Jr. et al. |
| 11,970,664 B2 | 4/2024 | Larsen |
| 11,975,316 B2 | 5/2024 | Zalewski |
| 12,000,720 B2 | 6/2024 | Langlois, III |
| 12,018,216 B2 | 6/2024 | Larsen et al. |
| 12,031,094 B2 | 7/2024 | Sexton et al. |
| 12,031,676 B2 | 7/2024 | Craig et al. |
| 12,037,548 B2 | 7/2024 | Larsen et al. |
| 12,163,878 B2 | 12/2024 | Bledsoe, Jr |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |

(56) References Cited

U.S. PATENT DOCUMENTS

| | | |
|---|---|---|
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0216214 A1 | 9/2005 | Gorin |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0091059 A1 | 5/2006 | Barbaro |
| 2006/0162243 A1 | 7/2006 | Wolf |
| 2006/0169305 A1 | 8/2006 | Jansen et al. |
| 2006/0210456 A1 | 9/2006 | Bruggendick |
| 2006/0169064 A1 | 10/2006 | Anschutz et al. |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0220586 A1 | 9/2011 | Levitt |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1 | 9/2012 | Ellis |
| 2012/0272715 A1 | 11/2012 | Kriel et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0302738 A1 | 11/2013 | Rennie |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0251129 A1 | 9/2014 | Upadhyay |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0007720 A1 | 1/2015 | Vu |
| 2015/0034570 A1 | 2/2015 | Andreussi |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0045918 A1 | 2/2016 | Lapham |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0175749 A1 | 6/2016 | Suda |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0128859 A1 | 5/2017 | Levitt |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0234335 A1 | 8/2017 | LeBlanc et al. |
| 2017/0269559 A1 | 9/2017 | Trygstad |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0094809 A1 | 4/2018 | Lochschmied |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |

(56) References Cited

U.S. PATENT DOCUMENTS

| | | |
|---|---|---|
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0191385 A1 | 6/2020 | Carroll |
| 2020/0199462 A1 | 6/2020 | Klussman et al. |
| 2020/0208068 A1 | 7/2020 | Hossain et al. |
| 2020/0246743 A1 | 8/2020 | Sorensen |
| 2020/0291316 A1 | 9/2020 | Robbins et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0318280 A1 | 10/2021 | Ludlum |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041939 A1 | 2/2022 | Titta et al. |
| 2022/0041940 A1 | 2/2022 | Pradeep et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |
| 2024/0115996 A1 | 4/2024 | Rudd |
| 2024/0117262 A1 | 4/2024 | Eller |
| 2024/0118194 A1 | 4/2024 | Bledsoe, Jr. |
| 2024/0124790 A1 | 4/2024 | Sexton |
| 2024/0132786 A1 | 4/2024 | Sexton |
| 2024/0182803 A1 | 6/2024 | Woodchick |
| 2024/0189753 A1 | 6/2024 | Esquivel |
| 2024/0294837 A1 | 9/2024 | Larsen |
| 2024/0327723 A1 | 10/2024 | Larsen |
| 2024/0337352 A1 | 10/2024 | Craig |
| 2024/0399279 A1 | 12/2024 | Duong |

FOREIGN PATENT DOCUMENTS

| | | |
|---|---|---|
| CA | 2949201 | 11/2015 |
| CA | 2822742 | 12/2016 |
| CA | 3009808 | 7/2017 |
| CA | 2904903 | 8/2020 |
| CA | 3077045 | 9/2020 |
| CA | 2947431 | 3/2021 |
| CA | 3004712 | 6/2021 |
| CA | 2980055 | 12/2021 |
| CA | 2879783 | 1/2022 |
| CA | 2991614 | 1/2022 |
| CA | 2980069 | 11/2022 |
| CA | 3109606 | 12/2022 |
| CH | 432129 | 3/1967 |
| CN | 2128346 | 3/1993 |
| CN | 201264907 Y | 7/2009 |
| CN | 201306736 | 9/2009 |
| CN | 201940168 | 8/2011 |
| CN | 102120138 | 12/2012 |
| CN | 203453713 | 2/2014 |
| CN | 103627433 | 3/2014 |
| CN | 203629938 | 6/2014 |
| CN | 203816490 | 9/2014 |
| CN | 104353357 | 2/2015 |
| CN | 204170623 | 2/2015 |
| CN | 103331093 | 4/2015 |
| CN | 204253221 | 4/2015 |
| CN | 204265565 | 4/2015 |
| CN | 105148728 | 12/2015 |
| CN | 204824775 | 12/2015 |
| CN | 103933845 | 1/2016 |
| CN | 105289241 | 2/2016 |
| CN | 105536486 | 5/2016 |
| CN | 105804900 | 7/2016 |
| CN | 103573430 | 8/2016 |
| CN | 205655095 | 10/2016 |
| CN | 104326604 | 11/2016 |
| CN | 104358627 | 11/2016 |
| CN | 106237802 | 12/2016 |
| CN | 205779365 | 12/2016 |
| CN | 106407648 | 2/2017 |
| CN | 105778987 | 8/2017 |
| CN | 207179722 | 4/2018 |
| CN | 207395575 | 5/2018 |
| CN | 108179022 | 6/2018 |
| CN | 108704478 | 10/2018 |
| CN | 109126458 | 1/2019 |
| CN | 109423345 | 3/2019 |
| CN | 109499365 | 3/2019 |
| CN | 109705939 | 5/2019 |
| CN | 109722303 | 5/2019 |
| CN | 110129103 | 8/2019 |
| CN | 110229686 | 9/2019 |
| CN | 209451617 | 10/2019 |
| CN | 110987862 | 4/2020 |
| CN | 111336612 A | 6/2020 |

(56) References Cited

FOREIGN PATENT DOCUMENTS

| | | |
|---|---|---|
| CN | 213762571 U | 7/2021 |
| CN | 213824075 U | 7/2021 |
| CN | 215263512 U | 12/2021 |
| CN | 215288592 | 12/2021 |
| CN | 113963818 | 1/2022 |
| CN | 114001278 | 2/2022 |
| CN | 217431673 | 9/2022 |
| CN | 218565442 | 3/2023 |
| DE | 10179 | 6/1912 |
| DE | 3721725 | 1/1989 |
| DE | 19619722 | 11/1997 |
| DE | 102010017563 | 12/2011 |
| DE | 102014009231 A1 | 1/2016 |
| EP | 0142352 | 5/1985 |
| EP | 0527000 | 2/1993 |
| EP | 0783910 A1 | 7/1997 |
| EP | 0949318 | 10/1999 |
| EP | 0783910 B1 | 12/2000 |
| EP | 0801299 | 3/2004 |
| EP | 1413712 | 4/2004 |
| EP | 1600491 | 11/2005 |
| EP | 1870153 | 12/2007 |
| EP | 2047905 | 4/2009 |
| EP | 2955345 | 12/2015 |
| EP | 3130773 | 2/2017 |
| EP | 3139009 | 3/2017 |
| EP | 3239483 | 11/2017 |
| EP | 3085910 | 8/2018 |
| EP | 3355056 | 8/2018 |
| EP | 2998529 | 2/2019 |
| EP | 3441442 | 2/2019 |
| EP | 3569988 | 11/2019 |
| EP | 3878926 | 9/2021 |
| FR | 2357630 | 2/1978 |
| FR | 3004722 | 3/2016 |
| FR | 3027909 | 5/2016 |
| FR | 3067036 | 12/2018 |
| FR | 3067037 | 12/2018 |
| FR | 3072684 | 4/2019 |
| FR | 3075808 | 6/2019 |
| GB | 775273 | 5/1957 |
| GB | 933618 | 8/1963 |
| GB | 1207719 | 10/1970 |
| GB | 2144526 | 3/1985 |
| GB | 2516441 | 1/2015 |
| IN | 202111016535 | 7/2021 |
| JP | 59220609 | 12/1984 |
| JP | 2003129067 | 5/2003 |
| JP | 2005147478 A | 6/2005 |
| JP | 3160405 | 6/2010 |
| JP | 2015059220 | 3/2015 |
| JP | 2019014275 | 1/2019 |
| KR | 101751923 | 7/2017 |
| KR | 101823897 | 3/2018 |
| KR | 20180095303 | 8/2018 |
| KR | 20190004474 | 1/2019 |
| KR | 20190004475 | 1/2019 |
| RU | 2673558 | 11/2018 |
| RU | 2700705 | 9/2019 |
| RU | 2760879 | 12/2021 |
| TW | 320682 | 11/1997 |
| WO | 94/08225 | 4/1994 |
| WO | 199640436 | 12/1996 |
| WO | 1997033678 | 9/1997 |
| WO | 199803249 | 1/1998 |
| WO | 1999041591 | 8/1999 |
| WO | 2001051588 | 7/2001 |
| WO | 2002038295 | 5/2002 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020035797 | 2/2020 |
| WO | 2020160004 | 8/2020 |
| WO | 2021058289 | 4/2021 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023020797 | 2/2023 |
| WO | 2023038579 | 3/2023 |
| WO | 2023137304 | 7/2023 |
| WO | 2023164683 | 8/2023 |
| WO | 2023242308 | 12/2023 |

OTHER PUBLICATIONS

Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.

Platvoet et al., Process Burners 101, American Institute of Chemical Engineers, Aug. 2013.

Luyben, W. L., Process Modeling, Simulation, and Control for Chemical Engineers, Feedforward Control, pp. 431-433.

Cooper et al., Calibration transfer of near-IR partial least squares property models of fuels using standards, Wiley Online Library, Jul. 19, 2011.

ABB Measurement & Analytics, Using FT-NIR as a Multi-Stream Method for CDU Optimization, Nov. 8, 2018.

Modcon Systems LTD., On-Line NIR Analysis of Crude Distillation Unit, Jun. 2008.

ABB Measurement & Analytics, Crude distillation unit (CDU) optimization, 2017.

Guided Wave Inc., The Role of NIR Process Analyzers in Refineries to Process Crude Oil into Useable Petrochemical Products, 2021.

ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.

Bueno, Alexis et al., Characterization of Catalytic Reforming Streams by NIR Spectroscopy, Energy & Fuels 2009, 23, 3172-3177, Apr. 29, 2009.

Caricato, Enrico et al., Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.

Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.

Rodriguez, Elena et al., Coke deposition and product distribution in the co-cracking of waste polyolefin derived streams and vacuum gas oil under FCC unit conditions, Fuel Processing Technology 192 (2019), 130-139.

(56) References Cited

OTHER PUBLICATIONS

Passamonti, Francisco J. et al., Recycling of waste plastics into fuels, PDPE conversion in FCC, Applied Catalysis B: Environmental 125 (2012), 499-506.
De Rezende Pinho, Andrea et al., Fast pyrolysis oil from pinewood chips co-processing with vacuum gas oil in an FCC unit for second generation fuel production, Fuel 188 (2017), 462-473.
Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.
Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production— Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zhou et al., Study on the Integration of Flue Gas Waste He Desulfuization and Dust Removal in Civilian Coalfired Heating Furnance, 2020 IOP Conf. Ser.: Earth Environ. Sci. 603 012018.
Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils—, Part 1: Determination by hot filtration, Second Edition, 2009.
International Standard, ISO 10307-2, Petroleum products—Total sediment in residual fuel oils—, Part 2: Determination using standard procedures for aging, Second Edition, 2009.
Ebner et al., Deactivatin and durability of the catalyst for Hotspot™ natural gas processing, OSTI, 2000, https://www.osti/gov/etdeweb/servlets/purl/20064378, (Year: 2000).
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.
Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.
Okonkwo et al., Role of Amine Structure on Hydrogen Sulfide Capture from Dilute Gas Streams Using Solid Adsorbents, Energy Fuels, 32, pp. 6926-6933, 2018.
Okonkwo et al., Selective removal of hydrogen sulfide from simulated biogas streams using sterically hindered amine adsorbents, Chemical Engineering Journal 379, pp. 122-349, 2020.
Lloyd's Register, Using technology to trace the carbon intensity of sustainable marine fuels, Feb. 15, 2023.
"Development of Model Equations for Predicting Gasoline Blending Properties", Odula et al., American Journal of Chemical Engineering, vol. 3, No. 2-1, 2015, pp. 9-17.
Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344 (Year: 2011).
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.
Lerh et al., Feature: IMO 2020 draws more participants into Singapore's bunkering pool., S&P Global Platts, www.spglobal.com, Sep. 3, 2019.
Cremer et al., Model Based Assessment of the Novel Use of Sour Water Stripper Vapor for NOx Control in CO Boilers, Industrial Combustion Symposium, American Flame Research Committee 2021, Nov. 19, 2021.
Frederick et al., Alternative Technology for Sour Water Stripping, University of Pennsylvania, Penn Libraries, Scholarly Commons, Apr. 20, 2018.
Da Vinci Laboratory Solutions B. V., DVLS Liquefied Gas Injector, Sampling and analysis of liquefied gases, https://www.davinci-ls.com/en/products/dvls-products/dvls-liquefied-gas-injector.
Wasson ECE Instrumentation, LPG Pressurization Station, https://wasson-ece.com/products/small-devices/lpg-pressurization-station.
Mechatest B. V., Gas & Liquefied Gas Sampling Systems, https://www.mechatest.com/products/gas-sampling-system/.
La Rivista dei Combustibili, The Fuel Magazine, vol. 66, File 2, 2012.
Zulkefi et al., Overview of H2S Removal Technologies from Biogas Production, International Journal of Applied Engineering Research ISSN 0973-4562, vol. 11, No. 20, pp. 10060-10066, © Research India Publications, 2016.
Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.

* cited by examiner

SYSTEMS, APPARATUSES, AND METHODS FOR SAMPLE CYLINDER INSPECTION, PRESSURIZATION, AND SAMPLE DISPOSAL

PRIORITY CLAIM

This U.S. non-provisional patent application claims priority to and the benefit of U.S. Provisional Application No. 63/466,043, filed May 12, 2023, titled "SYSTEMS, APPARATUSES, AND METHODS FOR SAMPLE CYLINDER INSPECTION, PRESSURIZATION, AND SAMPLE DISPOSAL," the disclosure of which is incorporated herein by reference in its entirety.

TECHNICAL FIELD

The present disclosure relates to systems, apparatuses, and methods for sample cylinder inspection, pressurization, and sample disposal and, more particularly, to systems, apparatuses, and methods for inspection, pressurization, and sample disposal for sample cylinders containing material samples for testing.

BACKGROUND

During many chemical manufacturing processes, it may be desirable to periodically determine one or more properties of a material associated with the process. For example, it may be desirable to determine one or more properties of a material associated with the process in order to ensure that the process is proceeding as desired. Material samples may be collected in a sample cylinder, which may be designed to safely contain the material sample until it is tested. For example, a sample of the material may be deposited into the sample cylinder, and the sample cylinder may be taken to a laboratory for testing the material sample. Because the material sample is contained within the sample cylinder, the walls of which are often opaque, it may be difficult to determine the condition and/or contents of the material sample. For example, it may be difficult to determine whether contaminates are present in the sample cylinder. In addition, depending on the form of the material contained in the sample cylinder (e.g., whether the material sample is in liquid form and/or gaseous form), it may be desirable to determine how much of the material sample is contained in the sample cylinder. In addition, it may be desirable to pressurize (or expand) the material sample prior to testing the material sample. In some instances, following testing of the material sample, it may be desirable to prepare the sample cylinder for future use, and thus, it may be desirable to remove any remaining portion of the material sample from the sample cylinder, so that the sample cylinder may be used to collect and contain another material sample without contamination from the material sample that was previously contained in the sample cylinder.

Accordingly, Applicant has recognized a need for enhancing the handling of a sample cylinder to facilitate testing of a material sample contained in the sample cylinder. The present disclosure may address one or more of the above-referenced considerations, as well as other possible considerations.

SUMMARY

As referenced above, Applicant has recognized that it may be desirable to provide systems, apparatuses, and methods for sample cylinder inspection, pressurization, and/or sample disposal. For example, Applicant has recognized that it may be desirable to provide a way to inspect the contents of a sample cylinder prior to testing the sample material, for example, to determine whether contaminates are present and/or how much of the material sample is contained in the sample cylinder. Applicant has also recognized that in some instances, it may be desirable to change the pressure inside the sample cylinder, depending, for example, on the form of the material sample. Altering the pressure may enhance or facilitate the accuracy of the testing of the material sample. In addition, Applicant has recognized that following testing of the material sample, it may be desirable to remove any of the material sample remaining in the sample cylinder following testing.

The present disclosure generally is directed to systems, apparatuses, and methods for enhancing handling of a sample cylinder for testing a material sample contained in the sample cylinder that may address one or more of the above-mentioned considerations, as well as possibly others. For example, in some embodiments, a system for enhancing handling of a sample cylinder may include one or more stations to facilitate handling of the sample cylinder. For example, in some embodiments, the systems, apparatuses, and methods may facilitate inspection of the contents of the sample cylinder and/or facilitate determination of the amount of the material sample contained in the sample cylinder. In some embodiments, the systems, apparatuses, and methods may facilitate altering the pressure of inside the sample cylinder. In some embodiments, the systems, apparatuses, and methods may facilitate removing any of the material sample remaining in the sample cylinder following testing of the material sample, thereby to reduce the likelihood of contamination of a sample material collected in the sample cylinder following testing of the material sample that was previously contained in the sample cylinder.

In some embodiments, a system for enhancing handling of a sample cylinder may include a platform having a first opening, a second opening, and a third opening. The system further may include a first station positioned to receive a sample cylinder in a first state in which the sample cylinder contains a material sample. The first station may include a first mounting fixture attached to the platform proximate the first opening and configured to be attached to the sample cylinder. The first station further may include an at least partially transparent receptacle configured to be attached to the sample cylinder and facilitate inspection of a portion of the material sample. The first station also may include a first valve positioned proximate the first mounting fixture and configured to provide fluid flow from the sample cylinder, thereby to remove a portion of the material sample from the sample cylinder. The system further may include a second station positioned to receive the sample cylinder in a second state following the first state in which the sample cylinder contains the material sample. The second station may include a second mounting fixture attached to the platform proximate the second opening and configured to be attached to the sample cylinder in the second state. The second station further may include a second valve positioned proximate the second mounting fixture and configured to provide fluid flow between a source of pressurized gas and the sample cylinder, thereby to pressurize the sample cylinder. The system also may include a third station positioned to receive the sample cylinder in a third state following discharge of at least a portion of the material sample from the sample cylinder. The third station may include a third mounting fixture attached to the platform proximate the third opening and configured to be attached to the sample cylinder in the third state. The third station further may include a third valve positioned proximate the third mounting fixture and configured to provide fluid flow between the sample cylinder and one or more of ventilation ductwork or a receptacle.

In some embodiments, a system for enhancing handling of a liquid petroleum gas (LPG) sample cylinder may include a platform having a first opening, a second opening, and a third opening. The system further may include a first station positioned to receive an LPG sample cylinder in a first state in which the LPG sample cylinder contains an LPG sample. The first station may include a first mounting fixture attached to the platform proximate the first opening and configured to be attached to the LPG sample cylinder. The first station further may include an at least partially transparent receptacle configured to be attached to the LPG sample cylinder and facilitate inspection of a portion of the LPG sample. The first station also may include a first valve positioned proximate the first mounting fixture and configured to provide fluid flow from the LPG sample cylinder, thereby to remove a portion of the LPG sample from the LPG sample cylinder. The system further may include a second station positioned to receive the LPG sample cylinder in a second state following the first state in which the LPG sample cylinder contains the LPG sample. The second station may include a second mounting fixture attached to the platform proximate the second opening and configured to be attached to the LPG sample cylinder in the second state. The second station further may include a second valve positioned proximate the second mounting fixture and configured to provide fluid flow between a source of pressurized gas and the LPG sample cylinder, thereby to pressurize the LPG sample cylinder. The system also may include a third station positioned to receive the LPG sample cylinder in a third state following discharge of at least a portion of the LPG sample from the sample cylinder. The third station may include a third mounting fixture attached to the platform proximate the third opening and configured to be attached to the LPG sample cylinder in the third state. The third station further may include a third valve positioned proximate the third mounting fixture and configured to provide fluid flow between the LPG sample cylinder and one or more of ventilation ductwork or a receptacle.

In some embodiments, a system for enhancing handling of a sample cylinder may include a first station positioned to receive a sample cylinder in a first state in which the sample cylinder contains a material sample. The first station may include an at least partially transparent receptacle configured to be attached to the sample cylinder and facilitate inspection of at least a portion of the material sample, and a first valve positioned to provide fluid flow from the sample cylinder, thereby to remove a portion of the material sample from the sample cylinder. The system further may include a second station positioned to receive the sample cylinder in a second state following the first state in which the sample cylinder contains the material sample. The second station may include a second valve positioned to provide fluid flow between a source of pressurized gas and the sample cylinder, thereby to pressurize the sample cylinder. The system also may include a third station positioned to receive the sample cylinder in a third state following discharge of at least a portion of the material sample from the sample cylinder. The third station may include a third valve positioned to provide fluid flow between the sample cylinder and one or more of ventilation ductwork or a receptacle.

In some embodiments, a method for enhancing handling of a sample cylinder may include associating a sample cylinder containing a material sample with a system for handling a sample cylinder. The method further may include inspecting the material sample contained in the sample cylinder, and pressurizing the material sample in the sample cylinder. The method also may include connecting the sample cylinder to a ventilation hood, thereby to provide selective fluid flow from the sample cylinder to the ventilation hood, and purging the material sample from the sample cylinder, thereby to release at least a portion of material sample to the ventilation hood.

In some embodiments, a method for enhancing handling of a sample cylinder may include connecting a first end of a sample cylinder containing a material sample with a first connector connected to a platform to facilitate inspection of the material sample. The method further may include connecting a second end of the sample cylinder to an at least partially transparent receptacle to facilitate inspection of the material sample. The method also may include disconnecting the second end of the sample cylinder from the at least partially transparent receptacle and disconnecting the first end of the sample cylinder from the first connector. The method further may include connecting the sample cylinder to a second connector connected to the platform, the second connector being in fluid communication with a gas supply valve positioned to provide fluid flow between a source of pressurized gas and the second connector. The method also may include opening the gas supply valve to pressurize the material sample in the sample cylinder. The method further may include closing the gas supply valve to prevent fluid flow between the source of pressurized gas to the second connector. The method also may include disconnecting the sample cylinder from the second connector and connecting one of the first end of the sample cylinder or the second end of the sample cylinder to a third connector connected to the platform, the third connector being in fluid communication with a ventilation hood. The method further may include purging the material sample from the LPG sample cylinder, thereby to release at least a portion of the material sample to the ventilation hood.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced.

According to common practice, the various features of the drawings discussed below are not necessarily drawn to scale. Dimensions of various features and elements in the drawings can be expanded or reduced to more clearly illustrate embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
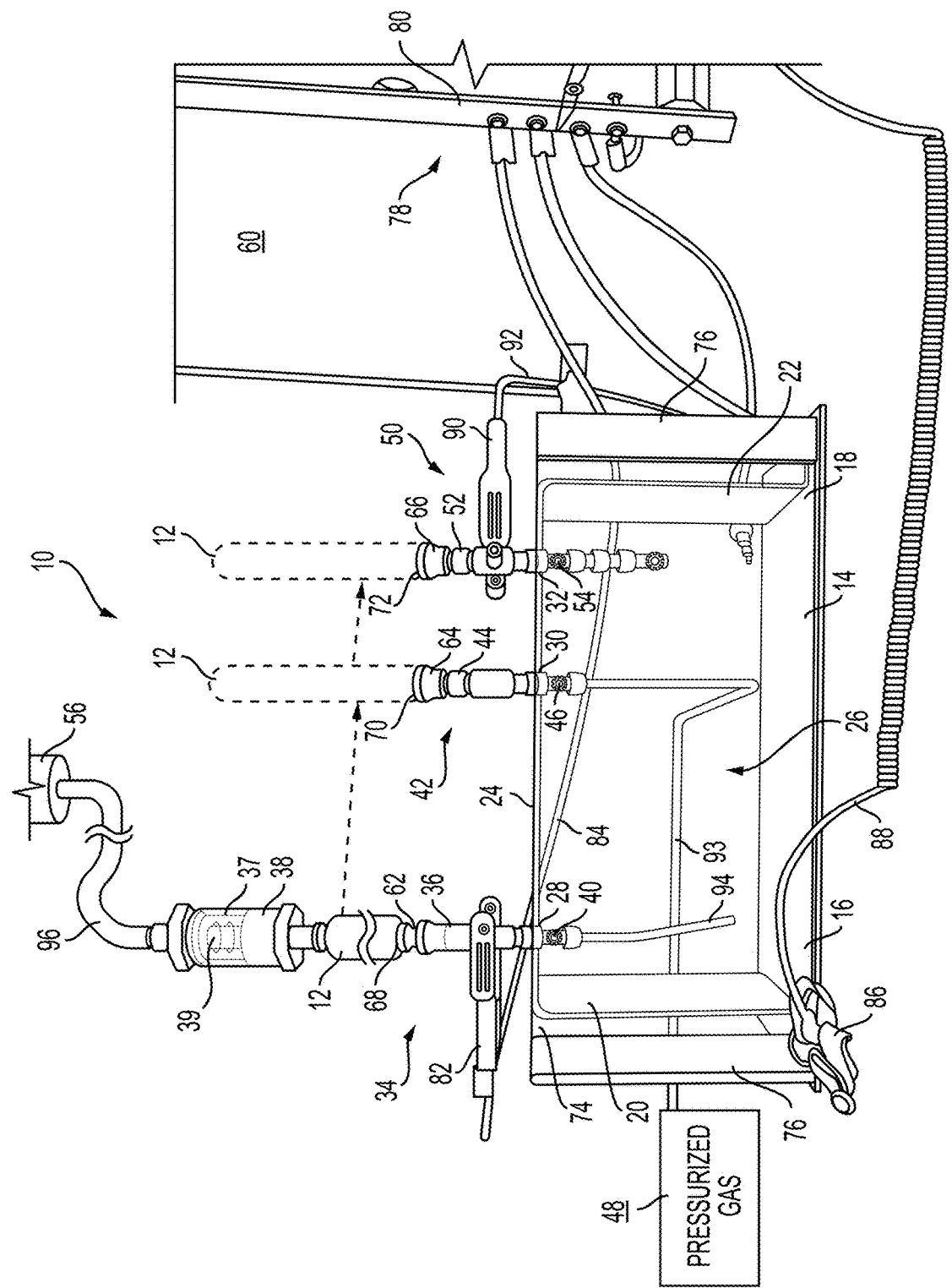
FIG. 1 is a schematic front perspective view from a first angle of an example system for enhancing handling of a sample cylinder, according to embodiments of the disclosure.

FIG. 1 schematically illustrates a front perspective view from a first angle of an example system 10 for enhancing handling of a sample cylinder 12 containing a material sample, according to embodiments of the disclosure. For example, the sample cylinder 12 may contain a material sample extracted from a chemical manufacturing process. As noted herein, it may be desirable to periodically determine one or more properties of a material associated with the process in order to ensure that the process is proceeding as desired. Material samples may be collected in the sample cylinder 12, which may be designed to safely contain the material sample until it is tested. For example, a sample of the material may be deposited into the sample cylinder 12, and the material sample may be tested to determine one or more properties of interest. For example, the sample material may be tested via testing equipment located proximate the location from which the material sample was collected, and/or the sample cylinder 12 may be transferred to a laboratory setting for testing the material sample, for example, as will be understood by those skilled in the art. For example, the sample cylinder 12 may contain a sample of liquid petroleum gas (LPG). Although some examples discussed herein may refer to material samples that include LPG, material samples including other materials are contemplated.

Applicant has recognized that for the purpose of improving the accuracy of testing a material sample, it may be desirable to inspect a sample cylinder containing a material sample for: (1) the presence of contaminates such as water and particulates in the material sample, and (2) the amount of the material sample contained in the sample cylinder 12. For example, contaminants in the sample cylinder may adversely affect the testing results and/or may foul testing instrumentation, and thus, it may be desirable to remove contaminates from the sample cylinder 12 prior to testing. In addition, depending on the form of the material sample (e.g., whether it is in gaseous or liquid form), if the volume of the amount of the material sample is greater than a certain percentage of the volume of the sample cylinder (e.g., greater than about 75%), a potentially hazardous condition may be created. For example, if the sample material is LPG and the temperature of the sample cylinder is increased, the volume of the LPG sample may grow to exceed the capacity of the sample cylinder, which may result in the sample cylinder rupturing.

Applicant has also recognized that once contaminates have been removed from the sample cylinder and the amount material sample contained in the sample cylinder is below the maximum desired amount, the sample cylinder may be prepared for transfer of the material sample from the sample cylinder into testing instrumentation. This may include pressurizing the material sample in the sample cylinder to ensure that the material sample is in liquid form for testing by the testing instrumentation. For example, if the material sample includes LPG, this may include pressurizing the LPG in the LPG sample cylinder to ensure that the LPG is in liquid form for testing by the testing instrumentation. In some embodiments, pressurization of the material sample may include pumping inert gas into the sample cylinder at a pressure of, for example, about 400 pounds per square inch or greater. Following use of the sample cylinder for testing, Applicant has recognized that it may be desirable to purge the sample cylinder to remove any portion of the material sample from the sample cylinder to prepare it for use for collection and testing of another material sample. For example, if the material sample includes LPG, it may be desirable to purge any portion of the LPG sample remaining in the sample cylinder following testing. This may include, for example, LPG and other petroleum cuts still present in the sample cylinder following testing.

In some embodiments, the system 10 for enhancing handling of a sample cylinder 12 may include a single integrated multi-station apparatus that may be used to perform the following one or more of the following four functions: (1) inspecting the sample cylinder 12 for contaminates; (2) ensuring that the sample cylinder 12 contains less than a predetermined maximum volume of the material sample relative to the total volume of the sample cylinder 12 (e.g., an amount ranging from less than about 75% to less than about 90%, for example, less than about 80%, of the total volume of the sample cylinder 12); (3) pressurizing the sample cylinder 12 to prepare it for being used to transfer material samples from the sample cylinder 12 into testing instrumentation; or (4) following use of the sample cylinder 12 for testing, venting any remaining gaseous contents of the sample cylinder 12 to a laboratory ventilation hood ductwork and removing any remaining liquid contents from the sample cylinder 12.

As shown in FIG. 1, in some embodiments, the system 10 for enhancing handling of the sample cylinder 12 may include a base 14 having a first end 16 and a second end 18 opposite the first end 16. The system 10 further may include a first upright 20 connected proximate the first end 16 of the base 14, and a second upright 22 connected proximate the second end 18 of the base 16. In some embodiments, a platform 24 may be connected to the first upright 20 and the second upright 22, thereby to provide a space 26 between the base 14 and platform 24. In some embodiments, the platform 24 may include a first opening 28, a second opening 30, and a third opening 32, each extending through the platform 24.

Figure 2:
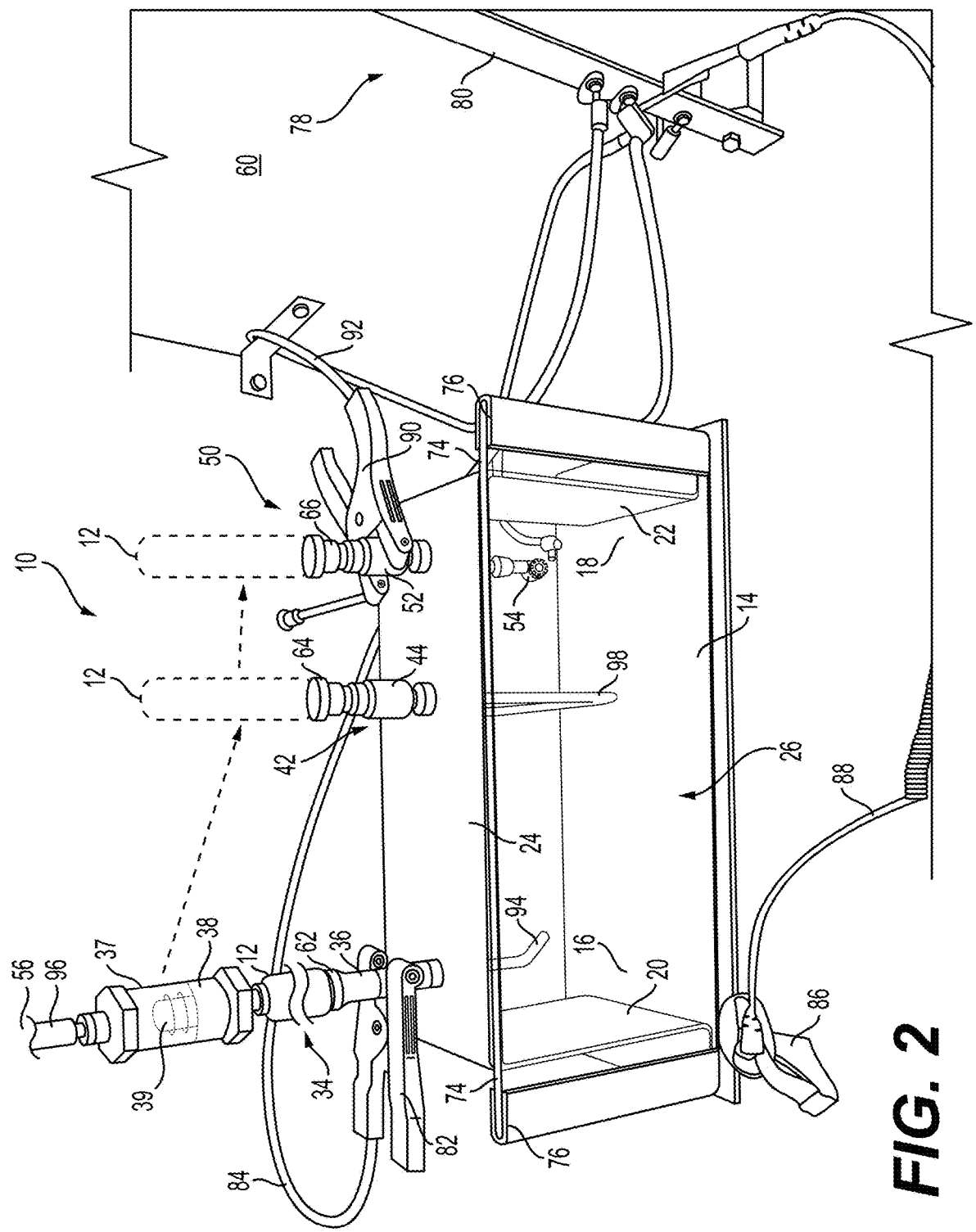
FIG. 2 is a schematic front perspective view from a second angle of the example system for enhancing handling of a sample cylinder shown in FIG. 1, according to embodiments of the disclosure.
Figure 3:
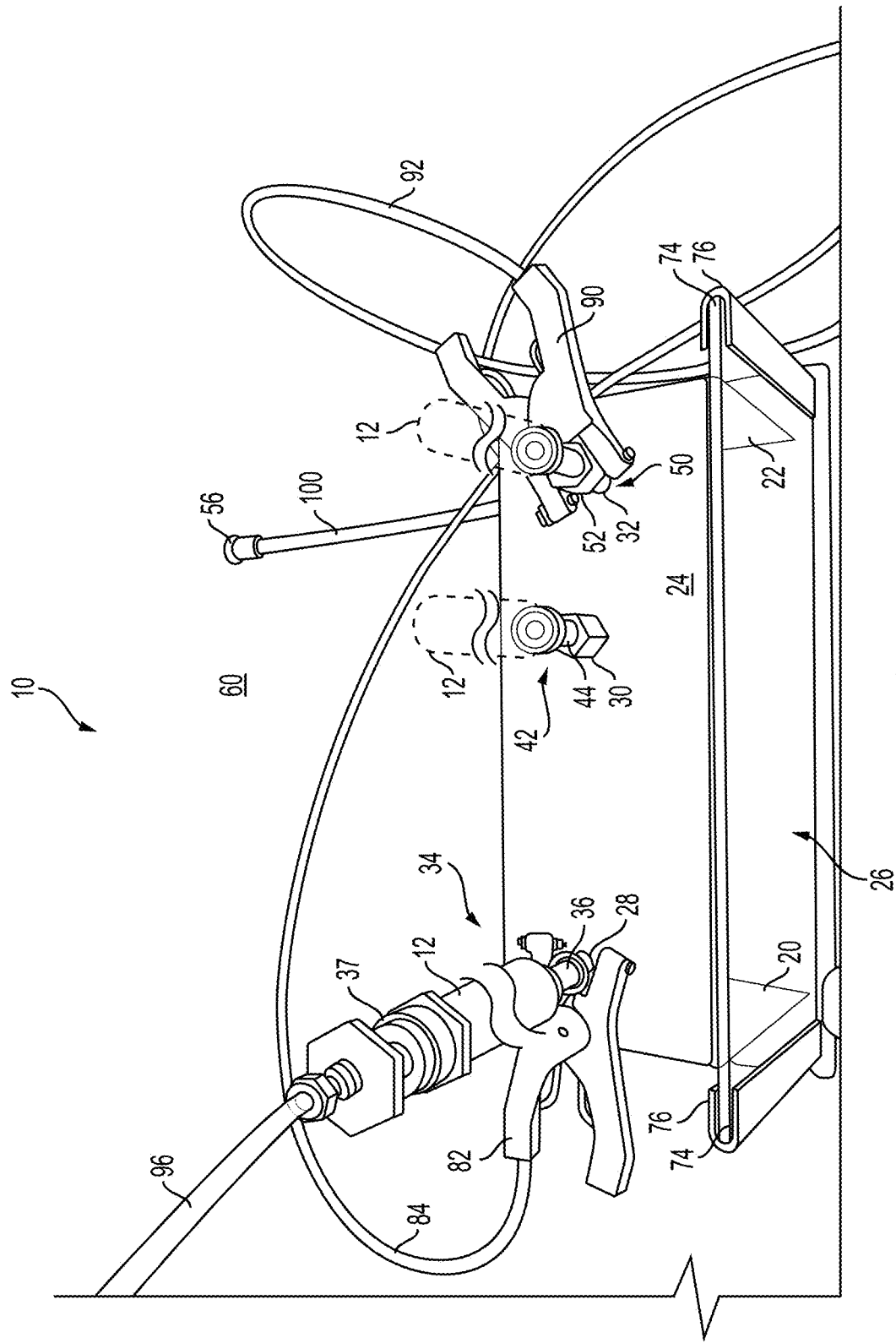
FIG. 3 is a schematic front perspective view from a third angle of the example system for enhancing handling of a sample cylinder shown in FIG. 1, according to embodiments of the disclosure.

FIG. 2 is a schematic front perspective view from a second angle (e.g., different than the first angle of FIG. 1) of the example system 10 for enhancing handling of a sample cylinder 12 shown in FIG. 1, and FIG. 3 is a schematic front perspective view from a third angle (e.g., different than the first angle of FIG. 1 and the second angle of FIG. 2) of the example system 10 for enhancing handling of the sample cylinder 12 shown in FIG. 1. As shown in FIGS. 1-3, the system 10 may include a first station 34 positioned to receive a sample cylinder 12, for example, in a first state in which the sample cylinder 12 contains a material sample (e.g., an LPG sample). In some embodiments, the first station 34 may include a first mounting fixture 36 attached to the platform 24 proximate the first opening 28 and configured to be attached to the sample cylinder 12 (e.g., an LPG sample cylinder). The first station 34 further may include an at least partially transparent receptacle 37 (e.g., a viewing glass) configured to be attached the sample cylinder 12 and facilitate inspection of a portion of a material sample 38. For example, the sample cylinder 12 may be opaque (e.g., formed from metal such as aluminum and/or stainless steel), and the at least partially transparent receptacle 37 may be configured to receive a portion of the material sample 38 therein, thereby to facilitate a visual inspection of the portion of the material sample 38 viewable in the at least partially transparent receptacle 37. In some embodiments, the at least partially transparent receptacle 37 may be substantially vertically oriented (e.g., a longitudinal axis of the at least partially transparent receptacle 37 may be substantially perpendicular relative to the base 14), for example, as shown in FIGS. 1 and 2. The at least partially transparent receptacle 37 may include any known receptacle facilitating a visual inspection of the portion of the material sample 38. In some embodiments, a flow meter 39 may be provided, for example, in the at least partially transparent receptacle 37, and the flow meter 39 may be configured to provide one or more flow signals indicative of the flow rate of fluid (e.g., a liquid) through the at least partially transparent receptacle 37.

As shown in FIGS. 1-3, in some embodiments, the first station 34 may include a first valve 40 positioned proximate the first mounting fixture 36 and opposite the platform 24 relative to the sample cylinder 12, for example, when a sample cylinder 12 is mounted to the first mounting fixture 36. The first valve 40 may be configured to provide fluid flow between the sample cylinder 12 and the space 26, thereby to remove a portion of the material sample from the sample cylinder 12.

As shown in FIGS. 1-3, the system 10 further may include a second station 42 positioned to receive the sample cylinder 12 in a second state following the first state, for example, in which the sample cylinder 12 contains the material sample 38. In some embodiments, the second station 42 may include a second mounting fixture 44 attached to the platform 24 proximate the second opening 30 and configured to be attached to the sample cylinder 12 in the second state. The second station 42 also may include a second valve 46 positioned proximate the second mounting fixture 44 and opposite the platform 24 relative to the sample cylinder 12, for example, when a sample cylinder 12 is mounted to the second mounting fixture 44, and configured to provide fluid flow between a source of pressurized gas 48 and the sample cylinder 12, thereby to pressurize the sample cylinder 12.

In some embodiments, as shown in FIGS. 1-3, the system 10 further may include a third station 50 positioned to receive the sample cylinder 12 in a third state, for example, following discharge of at least a portion of the material sample 38 from the sample cylinder 12. In some embodiments, the third station 50 may include a third mounting fixture 52 attached to the platform 24 proximate the third opening 32 and configured to be attached to the sample cylinder 12 in the third state. The third station 50 further may include a third valve 54 positioned proximate the third mounting fixture 52 and opposite the platform 24 relative to the sample cylinder 12, for example, when a sample cylinder 12 is mounted to the third mounting fixture 52, and configured to provide fluid flow between the sample cylinder 12 and one or more of ventilation ductwork 56 or a receptacle 58, such as, for example, ventilation ductwork associated with a ventilation hood and a beaker or flask, respectively, for receipt of portions of the material sample 38.

As shown in FIGS. 1-3, in some embodiments, two or more of the first station 34, the second station 42, or the third station 50 may form a single, integrated apparatus to perform one or more of the above-noted functions related to handling of a sample cylinder 12. For example, the system 10, in some embodiments, may be situated and used in a standard laboratory ventilation hood space 60 to increase the efficiency of handling of the sample cylinder and the material sample 38. Although schematically depicted in FIGS.

1-3 as being relatively short, the sample cylinders may range in length, for example, from about 10 inches to about 30 inches (e.g., from about 18 inches to about 20 inches).

In some embodiments, the system 10 may include a first boss 62, a second boss 64, and a third boss 66, each connected to the platform 24 and providing fixtures for receipt of a sample cylinder 12, as shown, at each of the first station 34, second station 42, and third station 50, respectively. One or more of the first boss 62, the second boss 64, or the third boss 66, in addition to providing respective passages through the platform 24 via the first opening 28, the second opening 30, and third opening 32, respectively, may be respectively provided with a first cylinder mount 68, a second cylinder mount 70, and a third cylinder mount 72, which may each include a quick-connect connector configured to facilitate ease of connection to a corresponding quick-connect connector mounted to an end of the sample cylinder 12. As a result, the sample cylinder 12, in at least some embodiments, may be quickly connected and quickly disconnected to each of the first, second, and/or third cylinder mounts 68, 70, and/or 72, for example, as the sample cylinder 12 progresses through two or more of the above-noted functions and undergoes, for example, inspection at the first station 34, pressurization at the second station 42, and/or venting and/or purging at the third station 50.

As shown in FIGS. 1-3, some embodiments of the system 10 also may include a shield 74, for example, to protect a laboratory technician from emission of contents from the sample cylinder 12 during handling. In some embodiments, the shield 74 may be formed from a translucent or transparent material (e.g., plexiglass) to enable a technician to see through the shield when facing the system 10. The shield 74, in some embodiments, may be slidably mounted to the system 10 via two upright support slots 76 connected to opposite ends of the base 14. The support slots 76 may facilitate removal and cleaning of the shield 74, for example, when the shield 74 becomes soiled from materials emitted from the sample cylinder 12, for example, as explained herein.

As shown in FIGS. 1-3, in some embodiments, the system 10 further may include a grounding assembly 78 positioned to electrically ground a technician handling the sample cylinder 12, the first station 34, the second station 42, and/or the third station 50. For example, the grounding assembly 78 may include an electrically grounded connection bus 80, for example, a copper bus bar electrically grounded to a suitable grounding device associated with the ventilation hood space 60. In some embodiments, the grounding assembly 78 may include a first clamp 82 configured to be attached to the first station 34, the second station 42, and/or the third station 50. The first clamp 82 may be electrically conductive. The grounding assembly 78 further may include a first cable 84 connected to the first clamp 82 and the electrically grounded connection bus 80. The first cable 84 may be electrically conductive. The grounding assembly 78 also may include a wearable attachment 86 configured to be attached to the technician handling the sample cylinder 12, and the wearable attachment 86 may be electrically conductive. The grounding assembly 78 further may include a second cable 88 connected to the wearable attachment 86 and the electrically grounded connection bus 80, and the second cable 88 may be electrically conductive. In some embodiments, the wearable attachment 86 may include a wrist strap for electrically grounding the technician. The system 12 further may include ground connections for electrically connecting to the first, second, and/or third bosses 62, 64, and/or 66, and/or to other metallic components associated with each of the first, second, and/or third stations 34, 42, and/or 50, to the connection bus 80 to electrically ground each of the stations. In some embodiments, this may reduce the likelihood or prevent generation of sparks associated with the technician and the stations, which may reduce the likelihood or prevent ignition of any volatile fumes that may be present under the ventilation hood space 60. In some embodiments, the grounding assembly 78 may include a second clamp 90 configured to be attached to the first station 34, the second station 42, and/or the third station 50. The second clamp 90 may be electrically conductive. The grounding assembly 78 further may include a third cable 92 connected to the second clamp 92 and the electrically grounded connection bus 80. The third cable 92 may be electrically conductive. Additional clamps and corresponding cables are contemplated.

Figure 4A:
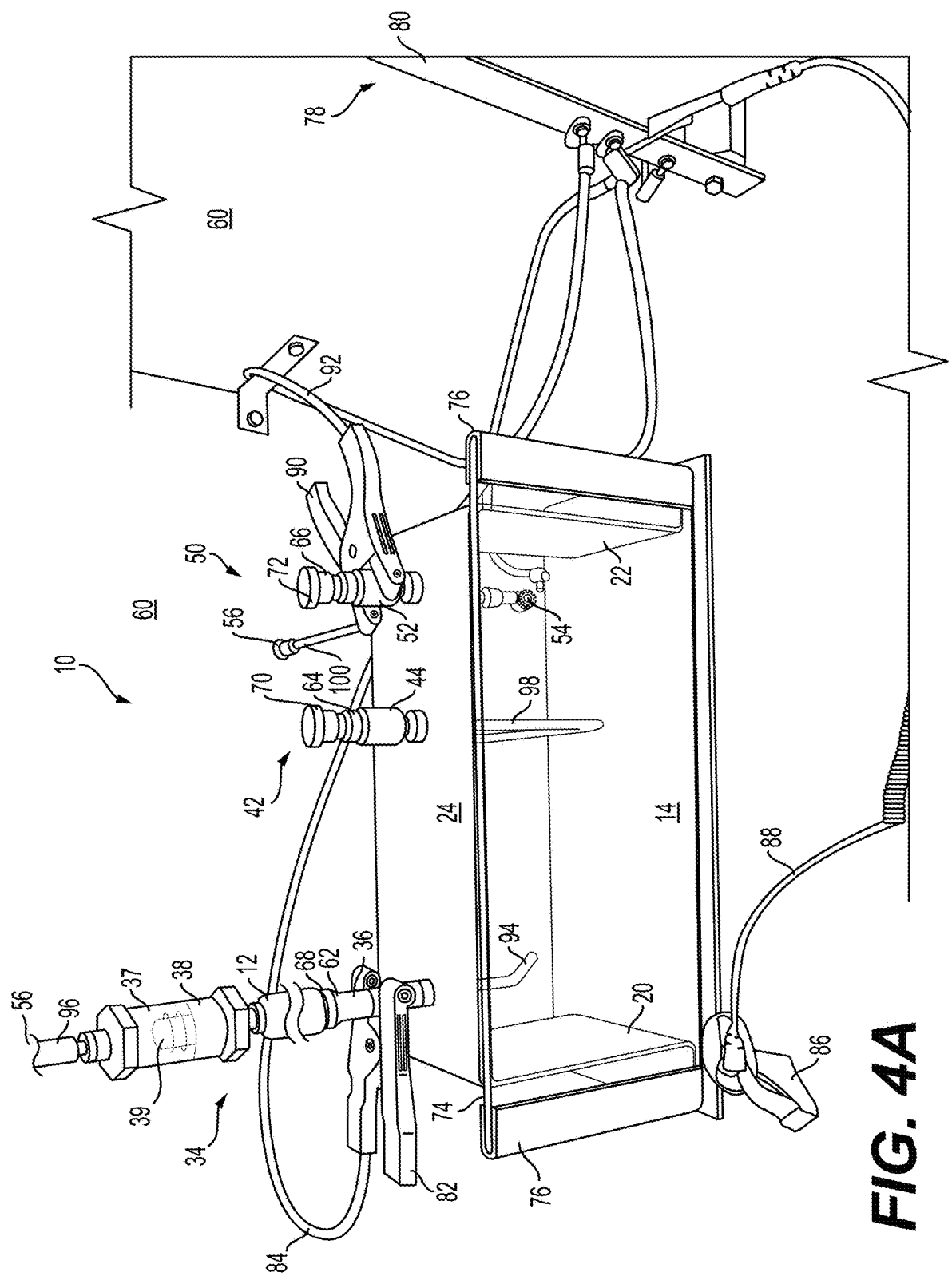
FIG. 4A is a schematic front perspective view of the example system for enhancing handling of a sample cylinder shown in FIG. 1 with an example sample cylinder mounted to an example first station of the system, according to embodiments of the disclosure.
Figure 4B:
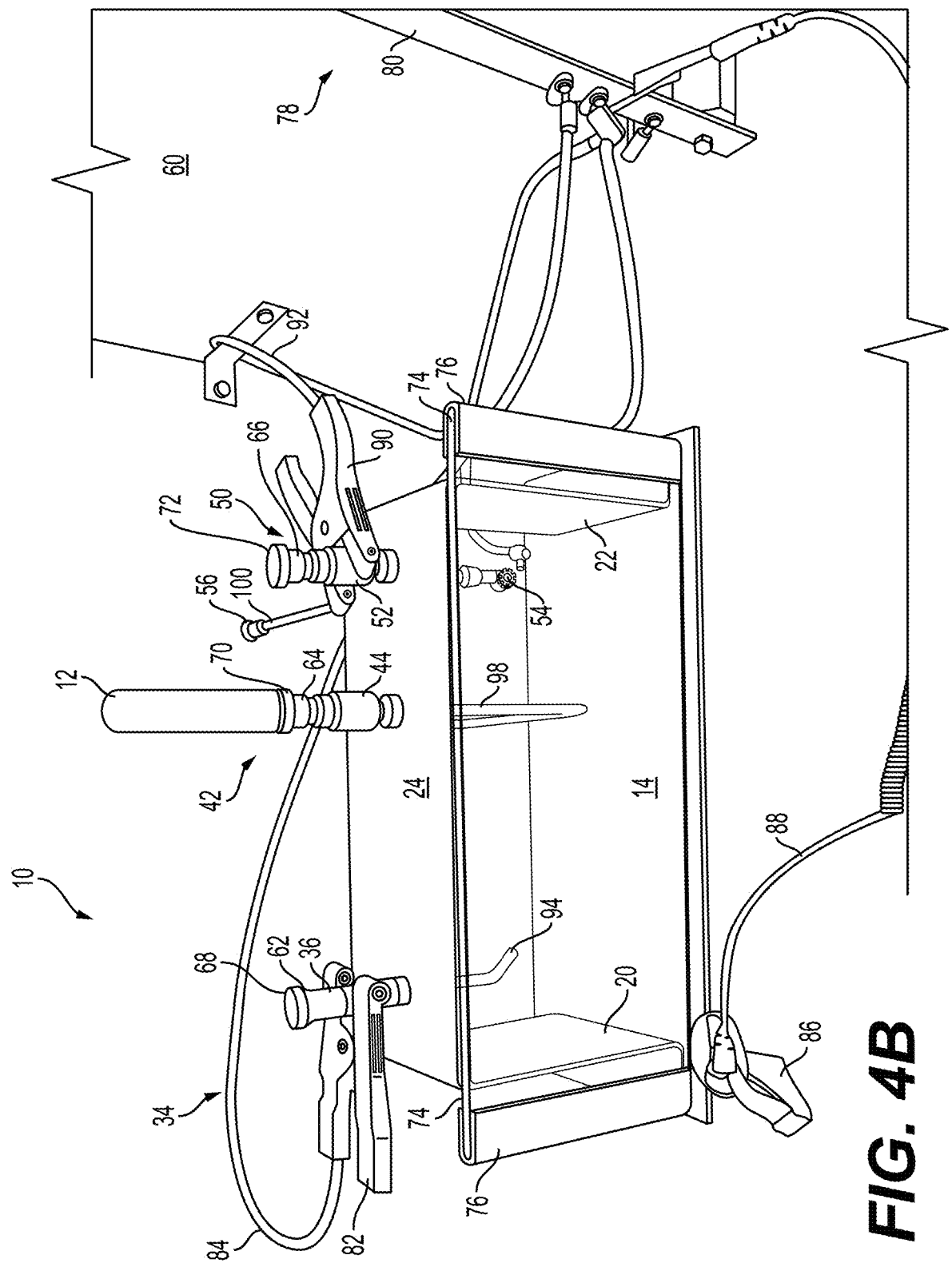
FIG. 4B is a schematic front perspective view of the example system for enhancing handling of a sample cylinder shown in FIG. 1 with an example sample cylinder mounted to an example second station of the system, according to embodiments of the disclosure.
Figure 4C:
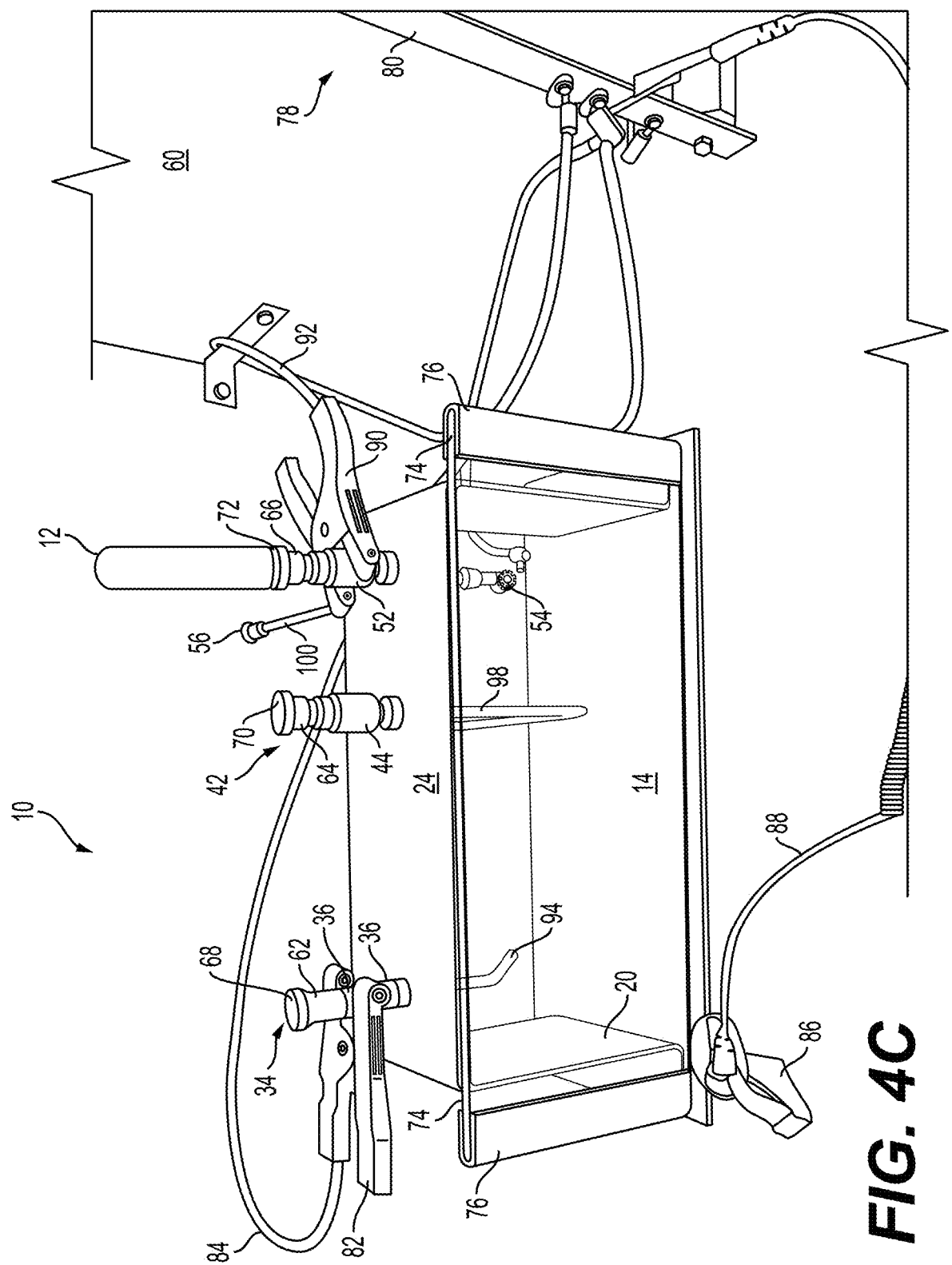
FIG. 4C is a schematic front perspective view of the example system for enhancing handling of a sample cylinder shown in FIG. 1 with an example sample cylinder mounted to an example third station of the system, according to embodiments of the disclosure.

FIG. 4A is a schematic front perspective view of the example system for enhancing handling of the sample cylinder 12 shown in FIG. 1, with an example sample cylinder 12 mounted to an example first station 34 of the system 10, according to embodiments of the disclosure. FIG. 4B is a schematic front perspective view of the example system 10 for enhancing handling of the sample cylinder 12 shown in FIG. 1, with an example sample cylinder 12 mounted to an example second station 42 of the system 12, according to embodiments of the disclosure. FIG. 4C is a schematic front perspective view of the example system 10 for enhancing handling of the sample cylinder 12 shown in FIG. 1, with an example sample cylinder 12 mounted to an example third station 50 of the system 10, according to embodiments of the disclosure.

As schematically depicted in FIGS. 4A-4C, a sample cylinder 12 may be moved between one or more of the first station 34, the second station 42, or the third station 50, for example, as the technician performs one or more of the functions described herein. For example, as shown in FIG. 4A, the technician may use the first cylinder mount 68 (e.g., a quick-connect connector) to mount the sample cylinder 12 to the first boss 62, and the technician may mount the at least partially transparent receptacle 37 to the upper end of the sample cylinder 12, for example, using an additional quick-connect connector. In some embodiments, at the first station 34, the technician may use the at least partially transparent receptacle 37 to inspect whether the sample cylinder 12 contains a greater volume of the material sample 38 (e.g., an LPG sample) than a predetermined maximum volume relative to the volume of the sample cylinder 12. This may range from less than about 75% to less than about 90%, for example, less than about 80%, of the total volume of the sample cylinder 12. If so, the technician may open the first valve 40, which may be located below the platform 24, to allow a portion of the contents of the sample cylinder 12 to drain via a bleed tube 94 below the platform 24 and above the base 14 until the desired amount of the material sample 38 contained in the sample cylinder 12 is achieved. The bleed tube 94 may be located behind the shield 74 and/or may be angled away from the shield 74, for example, to reduce the likelihood that the material bled from the sample cylinder 12 is directed toward the technician. The shield 74 also may serve to protect the technician from exposure to the material exiting the bleed tube 94. A receptacle, such as a beaker or flask, may receive the material bled from the sample cylinder 12, and the material may be inspected for contaminates, such as water and particulates.

In some embodiments, the technician also may use at least partially transparent receptacle 74 to inspect whether the sample cylinder 12 contains any contaminates, such as particulates, sludge, or water. In addition, a vent tube 96

(e.g., a translucent or transparent vent tube) may be provided at the top of the at least partially transparent receptacle 37 to vent any gaseous material from the sample cylinder 12. The vent tube 96 may be connected to the ductwork 56 of the ventilation hood 60 to reduce the likelihood or prevent any vented gaseous material from being expelled into the area surrounding the system 12. For example, the sample cylinder may contain caustic materials, such as hydrogen sulfide, which, if expelled under the ventilation hood 60 in an uncontrolled manner, could result in exposure of the technician to the caustic materials.

According to some embodiments, once the technician has verified the absence of contaminates, or removed them via the bleed tube 94 and/or the vent tube 96, and ensured that the sample amount is below the predetermined maximum amount, or removed some of the material sample 38, the technician may disconnect the sample cylinder 12 from the first cylinder mount 68 to unmount the sample cylinder 12 from the first boss 62, and disconnect the upper end of the sample cylinder 12 from the at least partially transparent receptacle 37 (e.g., via disconnection of a quick-connect connector). As shown in FIG. 4B, the technician may use the second cylinder mount 70 (e.g., a quick-connect connector) to mount the sample cylinder 12 to the second boss 64. In some embodiments, as discussed herein, the lower end of the second boss 64 may be connected to the second valve and the supply of pressurized gas 48 (see FIG. 1), which may be used to pressurize the sample cylinder 12, for example, to prepare it for transfer of at least a portion of the material sample 38 into testing instrumentation for testing the contents of the sample cylinder 12. For example, a gas supply line 98 may be connected to the supply of pressurized gas 48, which may be an inert gas, such as nitrogen, and the technician may open the second valve 46 to supply pressurized gas to the sample cylinder 12, which may increase the likelihood or ensure that the material sample 38 (e.g., an LPG sample) in the sample cylinder 12 is in liquid form for testing. Once the sample cylinder 12 has been pressurized to a desired pressure (e.g., about 400 psi), the technician may close the second valve 46 and separate the sample cylinder 12 from the second boss 64 of the second station 42, for example, using a quick-connect connector, and transfer the prepared (e.g., pressurized) sample cylinder 12 to testing instrumentation for desired sample testing.

Following the sample testing, as shown in FIG. 4C, the technician may use the third cylinder mount 72 (e.g., a quick-connect connector) to mount the sample cylinder 12 to the third boss 66 of the third station 50 for venting or purging any remaining contents of the sample cylinder 12 to the ductwork 56 of the ventilation hood 60 (e.g., gaseous contents) and/or to a receptacle (e.g., liquid contents). In some embodiments, as discussed herein, the lower end of the third boss 66 may be connected to the third valve 54 under the platform 24 and above the base 14. For example, the third valve 54 may include a T-valve that may be operated to cause gaseous material remaining in the sample cylinder 12 to flow directly to the ventilation hood ductwork 56 (via a vent line 100) (see FIG. 3). In some embodiments, a T-valve also may be operated to cause any liquid material (e.g., heavier petroleum cuts, such as pentanes and hexanes) to flow from the sample cylinder 12 and through the T-valve to a receptacle under the T-valve, such as a beaker or flask for collecting the liquid material.

Figure 5:
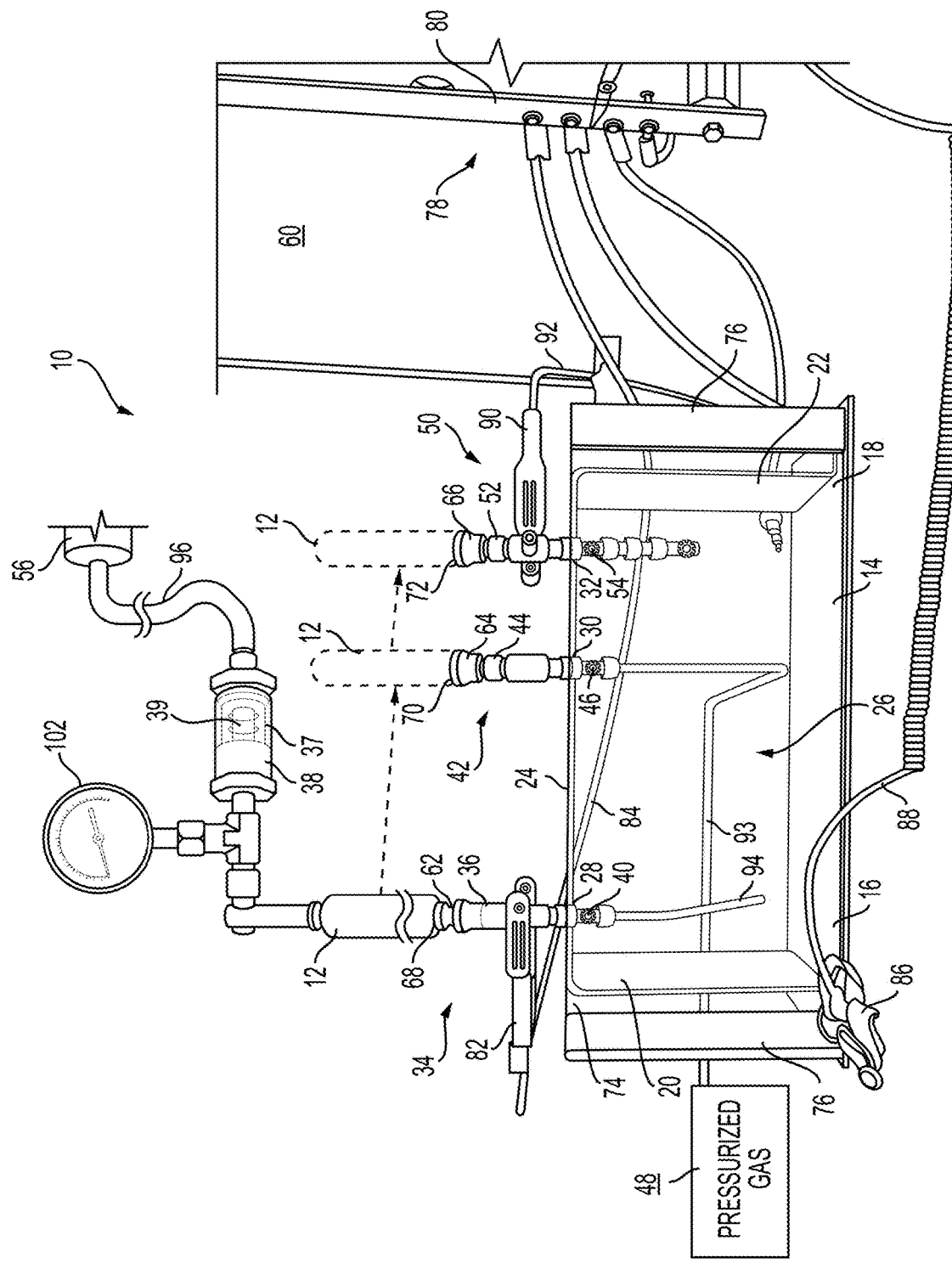
FIG. 5 is a schematic front perspective view of another example system for enhancing handling of a sample cylinder, according to embodiments of the disclosure.

FIG. 5 schematically illustrates a front perspective view of another example system 10 for enhancing handling of a sample cylinder 12 containing a material sample, according to embodiments of the disclosure. In some embodiments, the at least partially transparent receptacle 37 may be substantially horizontally oriented (e.g., such that a longitudinal axis of the at least partially transparent receptacle 37 is substantially parallel relative to the base 14), for example, as shown in FIG. 5. The orientation (e.g., the example horizontal orientation) may render it relatively easier, for example, as compared to a substantially vertical orientation (see, e.g., FIG. 1) to view fluid (e.g., a liquid) passing through the at least partially transparent receptacle 37. In some embodiments, a flow meter 39 may be provided, for example, in the at least partially transparent receptacle 37, and the flow meter 39 may be configured to provide one or more flow signals indicative of the flow rate of fluid (e.g., a liquid) through the at least partially transparent receptacle 37. In some embodiments, a flow meter may be omitted, which may render it relatively easier, for example, as compared to embodiments including a flow meter, to view fluid (e.g., a liquid) passing through the at least partially transparent receptacle 37.

As shown in FIG. 5, some embodiments of the example system 10 may include a pressure gauge 102 configured to indicate the pressure between the sample cylinder 12 and the at least partially transparent receptacle 37. For example, the pressure gauge 102 may be in flow communication with the sample cylinder 12 and/or the at least partially transparent receptacle 37. Provision of a pressure gauge at one or more other locations of the system 10 is contemplated.

Figure 6A:
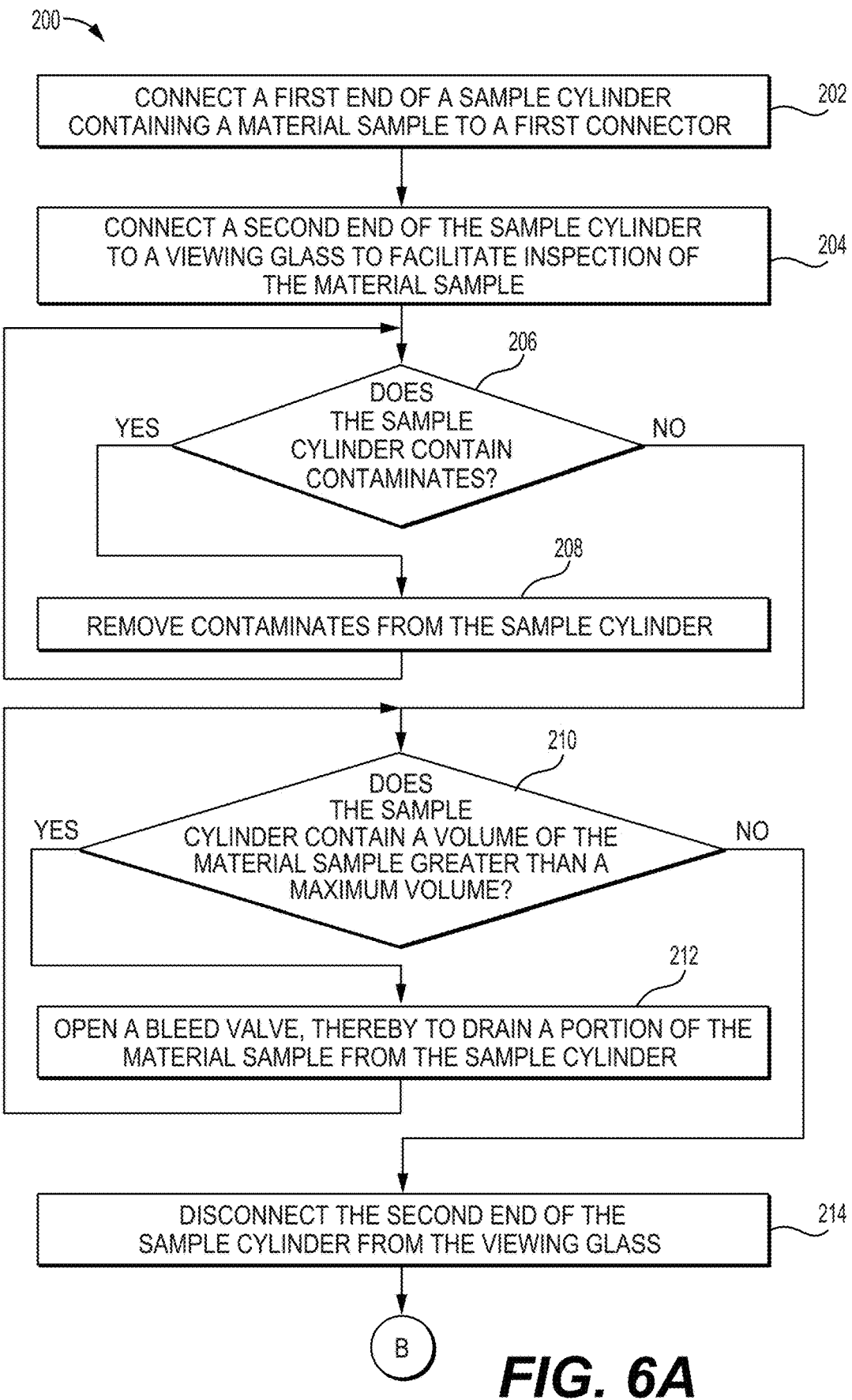
FIG. 6A is a block diagram of an example method for enhancing handling of a sample cylinder, according to embodiments of the disclosure.
Figure 6B:
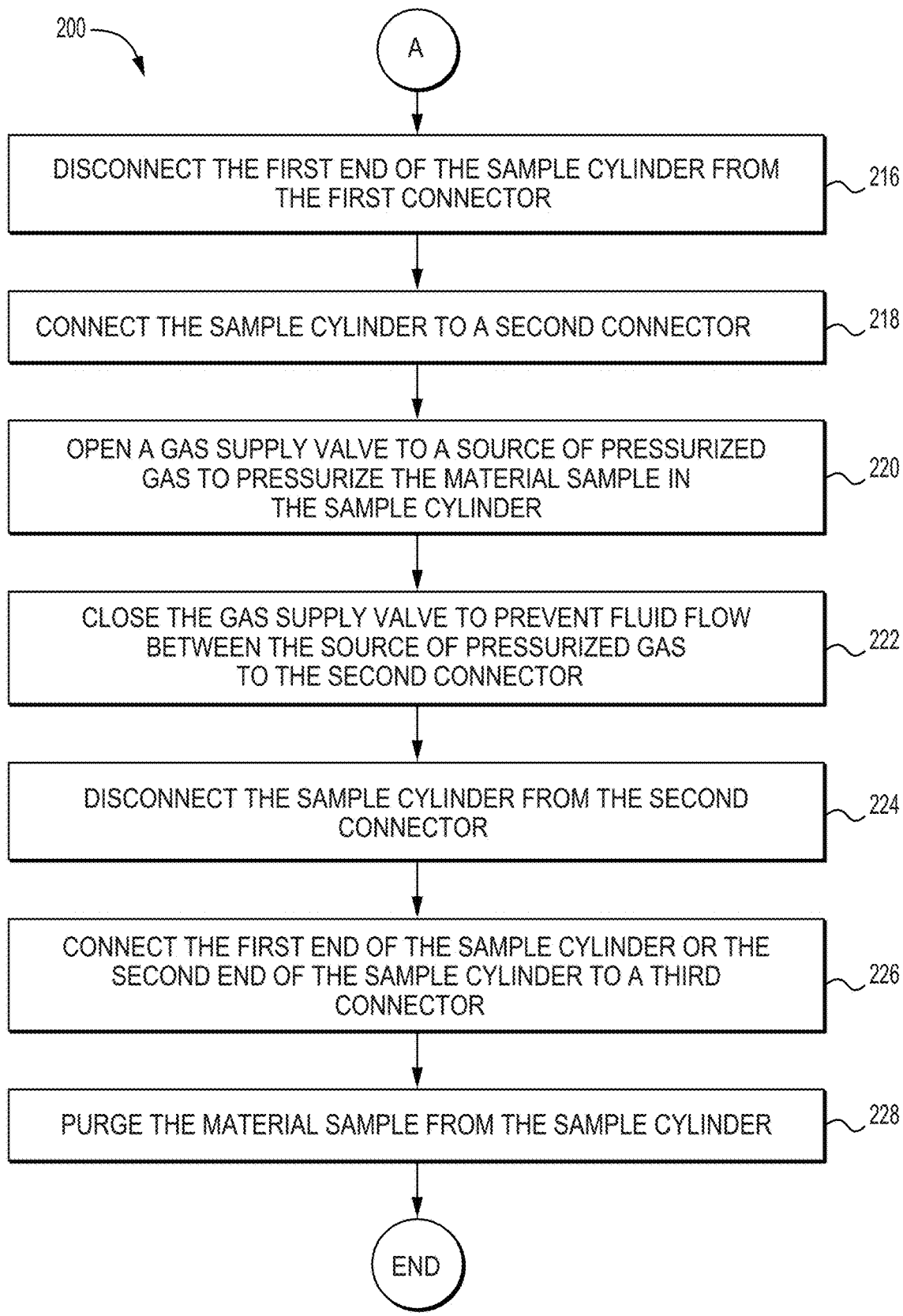
FIG. 6B is a continuation of the block diagram shown in FIG. 6A, according to embodiments of the disclosure.

FIG. 6A and FIG. 6B are a block diagram of an example method 200 for enhancing handling of a sample cylinder, according to embodiments of the disclosure. The example method 200 is illustrated as collections of blocks in a logical flow graph, which represent a sequence of operations. In the context of software, where applicable, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIGS. 6A and 6B are a block diagram of an example method 200 for enhancing handling of a sample cylinder containing a material sample, according to embodiments of the disclosure. In some embodiments, the sample cylinder may be an LPG sample cylinder containing an LPG sample. At 202, the example method 200 may include connecting a first end of a sample cylinder containing a material sample with a first connector connected to a platform to facilitate inspection of the material sample, for example, as described herein.

At 204, the example method 200 may include connecting a second end of the sample cylinder to an at least partially transparent receptacle (e.g., a viewing glass) to facilitate inspection of the material sample, for example, as described herein.

The example method 200, at 206, may include determining whether the sample cylinder contains contaminates, for example, as described herein. For example, the at least partially transparent receptacle may be used to determine whether the sample cylinder contains one or more of particulates, sludge, or water, for example, as described herein.

If, at 206, it is determined that the sample cylinder contains contaminates, the example method 200, at 208, may include removing contaminates from the sample cylinder. For example, a gaseous portion of the material sample may be vented via a vent tube connected to the at least partially transparent receptacle and a ventilation hood, for example, as described herein. In some examples, a liquid and/or solid portion of the contaminates may be bled from the sample cylinder via a bleed tube, for example, via operation of a bleed valve, as described herein. Thereafter, the example method 200 may include advancing to 210, once it is determined that the material sample is sufficiently free of contaminates.

If, at 206, it is determined that the sample cylinder does not contain contaminates, the example method 200, at 210, may include determining whether the sample cylinder contains a greater volume of the material sample than a predetermined maximum volume relative to the volume of the sample cylinder, for example, as described herein.

If, at 210, it is determined that the sample cylinder contains a greater volume of the material sample than a predetermined maximum volume relative to the volume of the sample cylinder, the example method 200, at 212, may include opening a bleed valve, thereby to drain a portion of the material sample from the sample cylinder until the volume of the material sample is less than the predetermined maximum volume, for example, as described herein. Thereafter, once it is determined that the sample cylinder no longer contains a greater volume of the material sample than the predetermined maximum volume relative to the volume of the sample cylinder, the example method 200 may include advancing to 214.

If, at 210, it is determined that the sample cylinder does not contain a greater volume of the material sample than the predetermined maximum volume relative to the volume of the sample cylinder, the example method 200, at 214, may include disconnecting the second end of the sample cylinder from the at least partially transparent receptacle, for example, as described herein.

At 216 (FIG. 6B), the example method 200 may include disconnecting the first end of the sample cylinder from the first connector, for example, as describe herein.

The example method 200, at 218, may include connecting the sample cylinder to a second connector connected to the platform, for example, as described herein. In some embodiments, the second connector may be in fluid communication with a gas supply valve positioned to provide fluid flow between a source of pressurized gas and the second connector.

At 220, the example method 200 may include opening the gas supply valve to pressurize the material sample in the sample cylinder, for example, as described herein. This may serve to ensure that the material sample is in liquid form ready for testing, for example, if the material sample is an LPG sample or similar sample.

The example method 200, at 222, may include closing the gas supply valve to prevent fluid flow between the source of pressurized gas to the second connector, for example, as described herein.

At 224, the example method 200 may include disconnecting the sample cylinder from the second connector, for example, as described herein. In some embodiments, the sample cylinder may be separated from the second connector for testing the material sample via sample testing equipment. For example, the sample cylinder may be ready to be used to test one or more properties of the material sample, for example, via material testing equipment, as will be understood by those skilled in the art.

The example method 200, at 226, following testing of the material sample, may include connecting the first end of the sample cylinder or the second end of the sample cylinder to a third connector connected to the platform, for example, as described herein. In some embodiments, the third connector may be in fluid communication with a ventilation hood, for example, as described herein.

At 228, the example method 200 may include purging the material sample from the sample cylinder, thereby to release at least a portion of the material sample to the ventilation hood, for example, as described herein. For example, purging the material sample from the sample cylinder may include operating a purge valve, thereby to cause gaseous material remaining in the sample cylinder to flow directly to ductwork of the ventilation hood via a vent line. In some embodiments, purging the material sample from the sample cylinder may include operating a purge valve, thereby to cause to cause liquid material in the sample cylinder to flow from the sample cylinder and through a T-valve to a receptacle positioned to collect the liquid material, for example, as described herein.

In some embodiments, the example method 200 may further include electrically connecting the platform, the first connector, the second connector, and/or the third connector to a grounded bus bar, thereby to electrically ground the platform, for example, as described herein. In some embodiments, the example method 200 may include electrically connecting a person handling the sample cylinder to a grounded bus bar, thereby to electrically ground the person, for example, as described herein. For example, electrically connecting the person handling the sample cylinder to the grounded bus bar may include attaching an electrically conductive strap to the person and the grounded bus bar, for example, as described herein.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This U.S. non-provisional patent application claims priority to and the benefit of U.S. Provisional Application No. 63/466,043, filed May 12, 2023, titled "SYSTEMS, APPARATUSES, AND) METHODS FOR SAMPLE CYLINDER INSPECTION, PRESSURIZATION, AND SAMPLE DISPOSAL," the disclosure of which is incorporated herein by reference in its entirety.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiments, and numerous variations, modifications, and additions further may be made thereto without departing from the spirit and scope of the present disclosure as set forth in the appended claims.

What is claimed is:

1. A system for enhancing handling of a sample cylinder, the system comprising:
   (a) a platform having a first opening, a second opening, and a third opening;
   (b) a first station positioned to receive a sample cylinder in a first state in which the sample cylinder contains a material sample, the first station comprising:
      (i) a first mounting fixture attached to the platform proximate the first opening and configured to be attached to the sample cylinder;
      (ii) an at least partially transparent receptacle configured to be attached to the sample cylinder and facilitate inspection of a portion of the material sample; and
      (iii) a first valve positioned proximate the first mounting fixture and configured to provide fluid flow from the sample cylinder, thereby to remove a portion of the material sample from the sample cylinder;
   (c) a second station positioned to receive the sample cylinder in a second state following the first state in which the sample cylinder contains the material sample, the second station comprising:
      (i) a second mounting fixture attached to the platform proximate the second opening and configured to be attached to the sample cylinder in the second state; and
      (ii) a second valve positioned proximate the second mounting fixture and configured to provide fluid flow between a source of pressurized gas and the sample cylinder, thereby to pressurize the sample cylinder;
   (d) a third station positioned to receive the sample cylinder in a third state following discharge of at least a portion of the material sample from the sample cylinder, the third station comprising:
      (i) a third mounting fixture attached to the platform proximate the third opening and configured to be attached to the sample cylinder in the third state; and
      (ii) a third valve positioned proximate the third mounting fixture and configured to provide fluid flow between the sample cylinder and one or more of ventilation ductwork or a receptacle; and
   (e) a grounding assembly positioned to electrically ground one or more of a person handling the sample cylinder, the first station, the second station, or the third station, the grounding assembly comprising one or more of:
      (i) an electrically grounded connection bus;
      (ii) a clamp configured to be attached to one or more of the first station, the second station, or the third station, the clamp being electrically conductive;
      (iii) a first cable connected to the clamp and the electrically grounded connection bus, the first cable being electrically conductive;
      (iv) a wearable attachment configured to be attached to the person handling the sample cylinder, the wearable attachment being electrically conductive; or
      (v) a second cable connected to the wearable attachment and the electrically grounded connection bus, the second cable being electrically conductive.

2. The system of claim 1, further comprising:
   a base and a panel connected to one or more of the base or the platform, thereby to provide a material shield between the base and the platform, the panel being substantially transparent; and
   a first support connected to the base and at least partially defining a first slot slidably receiving a first end of the panel and a second support at least partially defining a second slot slidably receiving a second end of the panel, thereby to facilitate removal and reattachment of the panel.

3. The system of claim 1, further comprising:
   a base having a first end and a second end opposite the first end;
   a panel connected to one or more of the base or the platform, thereby to provide a material shield between the base and the platform; and
   a bleed tube connected to the first valve and extending in a direction away from the panel.

4. The system of claim 1, further comprising a vent tube connected to the at least partially transparent receptacle and positioned to provide fluid flow between the at least partially transparent receptacle and ventilation ductwork, thereby to vent gas from the sample cylinder to the ventilation ductwork.

5. The system of claim 1, wherein the third valve comprises a T-valve positioned to provide fluid flow between the sample cylinder and the one or more of the ventilation ductwork or the receptable.

6. The system of claim 1, wherein one or more of the first mounting fixture, the second mounting fixture, or the third mounting fixture comprises a quick-connect connector for connecting to a quick-connect connector of the sample cylinder.

7. The system of claim 1, further comprising:
   a base having a first end and a second end opposite the first end;
   a first upright connected proximate the first end of the base; and
   a second upright connected proximate the second end of the base, the platform being connected to the first upright and the second upright,
   wherein one or more of:
      (a) the first valve is positioned opposite the platform relative to the first mounting fixture and is configured to provide fluid flow between the sample cylinder and the space;
      (b) the second valve is positioned opposite the platform relative to the second mounting fixture; or
      (c) the third valve is positioned opposite the platform relative to the third mounting fixture.

8. The system of claim 1, wherein the first station, the second station, and the third station form a unitary structure.

9. The system of claim 1, wherein the at least partially transparent receptacle is oriented such that an axis of the at least partially transparent receptacle is substantially horizontal.

10. The system of claim 1, further comprising a pressure gauge in fluid communication with the at least partially transparent receptacle.

11. The system of claim 1, wherein the sample cylinder comprises a liquid petroleum gas (LPG) sample cylinder.

12. A system for enhancing handling of a sample cylinder, the system comprising:
   (a) a first station positioned to receive a sample cylinder in a first state in which the sample cylinder contains a material sample, the first station comprising:

an at least partially transparent receptacle configured to be attached to the sample cylinder and facilitate inspection of at least a portion of the material sample; and
a first valve positioned to provide fluid flow from the sample cylinder, thereby to remove a portion of the material sample from the sample cylinder;
(b) a second station positioned to receive the sample cylinder in a second state following the first state in which the sample cylinder contains the material sample, the second station comprising a second valve positioned to provide fluid flow between a source of pressurized gas and the sample cylinder, thereby to pressurize the sample cylinder;
(c) a third station positioned to receive the sample cylinder in a third state following discharge of at least a portion of the material sample from the sample cylinder, the third station comprising a third valve positioned to provide fluid flow between the sample cylinder and one or more of ventilation ductwork or a receptable; and
(d) a grounding assembly positioned to electrically ground one or more of a person handling the sample cylinder, the first station, the second station, or the third station, the grounding assembly comprising:
(i) an electrically grounded connection bus; and
(ii) one or more of:
(aa) a clamp configured to be attached to one or more of the first station, the second station, or the third station, the clamp being electrically conductive; and a first cable connected to the clamp and the electrically grounded connection bus, the first cable being electrically conductive; or
(bb) a wearable attachment configured to be attached to the person handling the sample cylinder, the wearable attachment being electrically conductive; and a second cable connected to the wearable attachment and the electrically grounded connection bus, the second cable being electrically conductive.

13. The system of claim 12, further comprising:
a base and a panel connected to the base, thereby to provide a protective material shield between the system and a person handling the sample cylinder, the panel being at least partially transparent; and
a first support connected to the base and at least partially defining a first slot slidably receiving a first end of the panel and a second support at least partially defining a second slot slidably receiving a second end of the panel, thereby to facilitate separation of the panel from the base and mounting of the panel to the base.

14. The system of claim 12, further comprising:
a base having a first end and a second end opposite the first end;
a panel connected to the base, thereby to provide a protective material shield between the system and a person handling the sample cylinder;
a bleed tube connected to the first station and extending in a direction away from the panel; and
a vent tube connected to the at least partially transparent receptacle and positioned to provide fluid flow between the at least partially transparent receptacle and ventilation ductwork, thereby to vent gas from the sample cylinder to the ventilation ductwork.

15. The system of claim 12, wherein one or more of:
(a) the third valve comprises a T-valve positioned to provide fluid flow between the sample cylinder and the one or more of the ventilation ductwork or the receptable; or
(b) one or more of the first station, the second station, or the third station comprises a quick-connect connector for connecting to a quick-connect connector of the sample cylinder.

16. The system of claim 12, further comprising:
a base having a first end and a second end opposite the first end;
a first upright connected proximate the first end of the base;
a second upright connected proximate the second end of the base; and
a platform associated with one of more of the first station, the second station, or the third station, the platform being connected to the first upright and the second upright,
wherein one or more of:
(a) the first valve is positioned opposite the platform relative to the first station and configured to provide fluid flow between the sample cylinder and a space between the platform and the base;
(b) the second valve is positioned opposite the platform relative to the second station; or
(c) the third valve is positioned opposite the platform relative to the third station.

17. The system of claim 12, wherein the first station, the second station, and the third station form a unitary structure.

18. The system of claim 12, further comprising one or more of:
(a) a first mounting fixture associated with the first station and configured to be attached to the sample cylinder in a first state in which the sample cylinder contains a material sample;
(b) a second mounting fixture associated with the second station and configured to be attached to the sample cylinder in a second state following the first state in which the sample cylinder contains the material sample; or
(c) a third mounting fixture associated with the third station and configured to be attached to the sample cylinder in a third state following discharge of at least a portion of the material sample from the sample cylinder.

19. A system for enhancing handling of a sample cylinder, the system comprising:
(a) a platform having a first opening, a second opening, and a third opening;
(b) a first station positioned to receive a sample cylinder in a first state in which the sample cylinder contains a material sample, the first station comprising:
(i) a first mounting fixture attached to the platform proximate the first opening and configured to be attached to the sample cylinder;
(ii) an at least partially transparent receptacle configured to be attached to the sample cylinder and facilitate inspection of a portion of the material sample; and
(iii) a first valve positioned proximate the first mounting fixture and configured to provide fluid flow from the sample cylinder, thereby to remove a portion of the material sample from the sample cylinder;
(c) a second station positioned to receive the sample cylinder in a second state following the first state in which the sample cylinder contains the material sample, the second station comprising:
  (i) a second mounting fixture attached to the platform proximate the second opening and configured to be attached to the sample cylinder in the second state; and
  (ii) a second valve positioned proximate the second mounting fixture and configured to provide fluid flow between a source of pressurized gas and the sample cylinder, thereby to pressurize the sample cylinder;
(d) a third station positioned to receive the sample cylinder in a third state following discharge of at least a portion of the material sample from the sample cylinder, the third station comprising:
  (i) a third mounting fixture attached to the platform proximate the third opening and configured to be attached to the sample cylinder in the third state; and
  (ii) a third valve positioned proximate the third mounting fixture and configured to provide fluid flow between the sample cylinder and one or more of ventilation ductwork or a receptacle;
(e) a base having a first end and a second end opposite the first end;
(f) a panel connected to one or more of the base or the platform, thereby to provide a material shield between the base and the platform; and
(g) a bleed tube connected to the first valve and extending in a direction away from the panel.

20. The system of claim 19, further comprising a grounding assembly positioned to electrically ground one or more of a person handling the sample cylinder, the first station, the second station, or the third station, the grounding assembly comprising one or more of:
  (a) an electrically grounded connection bus;
  (b) a clamp configured to be attached to one or more of the first station, the second station, or the third station, the clamp being electrically conductive;
  (c) a first cable connected to the clamp and the electrically grounded connection bus, the first cable being electrically conductive;
  (d) a wearable attachment configured to be attached to the person handling the sample cylinder, the wearable attachment being electrically conductive; or
  (e) a second cable connected to the wearable attachment and the electrically grounded connection bus, the second cable being electrically conductive.

21. The system of claim 19, further comprising a first support connected to the base and at least partially defining a first slot slidably receiving a first end of the panel, and a second support at least partially defining a second slot slidably receiving a second end of the panel, thereby to facilitate removal and reattachment of the panel.

22. The system of claim 19, wherein one or more of:
  (a) the system further comprises a vent tube connected to the at least partially transparent receptacle and positioned to provide fluid flow between the at least partially transparent receptacle and ventilation ductwork, thereby to vent gas from the sample cylinder to the ventilation ductwork;
  (b) the third valve comprises a T-valve positioned to provide fluid flow between the sample cylinder and the one or more of the ventilation ductwork or the receptable; or
  (c) one or more of the first mounting fixture, the second mounting fixture, or the third mounting fixture comprises a quick-connect connector for connecting to a quick-connect connector of the sample cylinder.

23. The system of claim 19, wherein one or more of:
(a) the system further comprises:
  (i) a first upright connected proximate the first end of the base; and
  (ii) a second upright connected proximate the second end of the base, the platform being connected to the first upright and the second upright, wherein one or more of:
    (aa) the first valve is positioned opposite the platform relative to the first mounting fixture and is configured to provide fluid flow between the sample cylinder and the space;
    (bb) the second valve is positioned opposite the platform relative to the second mounting fixture; or
    (cc) the third valve positioned opposite the platform relative to the third mounting fixture; or
(b) the first station, the second station, and the third station form a unitary structure.

24. The system of claim 19, wherein one or more of:
(a) the at least partially transparent receptacle is oriented such that an axis of the at least partially transparent receptacle is substantially horizontal;
(b) the system further comprises a pressure gauge in fluid communication with the at least partially transparent receptacle; or
(c) the sample cylinder comprises a liquid petroleum gas (LPG) sample cylinder.

25. A system for enhancing handling of a sample cylinder, the system comprising:
(a) a first station positioned to receive a sample cylinder in a first state in which the sample cylinder contains a material sample, the first station comprising:
  (i) an at least partially transparent receptacle configured to be attached to the sample cylinder and facilitate inspection of at least a portion of the material sample; and
  (ii) a first valve positioned to provide fluid flow from the sample cylinder, thereby to remove a portion of the material sample from the sample cylinder;
(b) a second station positioned to receive the sample cylinder in a second state following the first state in which the sample cylinder contains the material sample, the second station comprising a second valve positioned to provide fluid flow between a source of pressurized gas and the sample cylinder, thereby to pressurize the sample cylinder;
(c) a third station positioned to receive the sample cylinder in a third state following discharge of at least a portion of the material sample from the sample cylinder, the third station comprising a third valve positioned to provide fluid flow between the sample cylinder and one or more of ventilation ductwork or a receptacle;
(d) a base having a first end and a second end opposite the first end;
(e) a panel connected to the base, thereby to provide a protective material shield between the system and a person handling the sample cylinder;
(f) a bleed tube connected to the first station and extending in a direction away from the panel; and
(g) a vent tube connected to the at least partially transparent receptacle and positioned to provide fluid flow between the at least partially transparent receptacle and ventilation ductwork, thereby to vent gas from the sample cylinder to the ventilation ductwork.

26. The system of claim 25, further comprising a grounding assembly positioned to electrically ground one or more of a person handling the sample cylinder, the first station, the second station, or the third station, the grounding assembly comprising:
(a) an electrically grounded connection bus; and
(b) one or more of:
  (i) a clamp configured to be attached to one or more of the first station, the second station, or the third station, the clamp being electrically conductive; and a first cable connected to the clamp and the electrically grounded connection bus, the first cable being electrically conductive; or
  (ii) a wearable attachment configured to be attached to the person handling the sample cylinder, the wearable attachment being electrically conductive; and a second cable connected to the wearable attachment and the electrically grounded connection bus, the second cable being electrically conductive.

27. The system of claim 25, wherein one or more of:
(a) the third valve comprises a T-valve positioned to provide fluid flow between the sample cylinder and the one or more of the ventilation ductwork or the receptable; or
(b) one or more of the first station, the second station, or the third station comprises a quick-connect connector for connecting to a quick-connect connector of the sample cylinder.

28. The system of claim 25, further comprising:
a base having a first end and a second end opposite the first end;
a first upright connected proximate the first end of the base;
a second upright connected proximate the second end of the base; and
a platform associated with one of more of the first station, the second station, or the third station, the platform being connected to the first upright and the second upright,
wherein one or more of:
  (a) the first valve is positioned opposite the platform relative to the first station and configured to provide fluid flow between the sample cylinder and a space between the platform and the base;
  (b) the second valve is positioned opposite the platform relative to the second station; or
  (c) the third valve is positioned opposite the platform relative to the third station.

29. The system of claim 25, wherein the first station, the second station, and the third station form a unitary structure.

30. The system of claim 25, further comprising one or more of:
(a) a first mounting fixture associated with the first station and configured to be attached to the sample cylinder in a first state in which the sample cylinder contains a material sample;
(b) a second mounting fixture associated with the second station and configured to be attached to the sample cylinder in a second state following the first state in which the sample cylinder contains the material sample; or
(c) a third mounting fixture associated with the third station and configured to be attached to the sample cylinder in a third state following discharge of at least a portion of the material sample from the sample cylinder.

* * * * *